United States Patent Office 3,046,250
Patented July 24, 1962

3,046,250
ORGANOSILICON HYDROXYALKYL-AMINE POLYMERS
Edwin P. Plueddemann, Midland, Mich., assignor to Dow Corning Corporation, Midland, Mich., a corporation of Michigan
No Drawing. Filed Oct. 4, 1957, Ser. No. 688,118
6 Claims. (Cl. 260—46.5)

This invention relates to new polymers containing silicon atoms joined by organo-amino groups which are connected to each silicon through silicon-carbon linkages.

A new class of organosilicon epoxides wherein each epoxy or epoxidized group is attached to the silicon by a silicon-carbon linkage was disclosed in applicant's copending application Serial No. 618,669, filed October 29, 1956, which application is incorporated into this application by reference. Applicant has now invented new polymers by reacting those organosilicon epoxides with ammonia and amine compounds.

This invention relates to organosilicon compositions containing at least two silicon atoms bonded by the linkage —XYX— in which each Y is a polyvalent radical attached to at least two X radicals by nitrogen-carbon bonds, said Y radical being free of hydrolyzable halogen atoms and acid groups having a dissociation constant greater than $10^{-3}$. Each X is a polyvalent organic radical connected to silicon by a silicon-carbon linkage and consisting of hydrogen atoms, carbon atoms and oxygen atoms, the latter being present as hydroxyl radicals, epoxy groups or ether linkages, said X radical containing at least one pair of adjacent carbon atoms, one carbon atom of said pair being attached to a hydroxyl group and the other carbon atom of said pair being attached to a nitrogen of the group Y. Each of the remaining valences of the silicon atoms in said silicon composition can be attached to a hydrogen atom, an oxygen atom, an hydroxyl radical, a monovalent hydrocarbon radical, a monovalent halogenohydrocarbon radical, a monovalent hydrocarbonoxy radical or a monovalent halogenohydrocarbonoxy radical.

The crux of this invention lies in the unique XYX linkage between two silicon atoms. The linkage can be straight chain, e.g. $\equiv$SiXYXSi$\equiv$, cyclic, e.g.

$$\equiv Si \begin{array}{c} XYX \\ XYX \end{array} Si\equiv$$

or branched chain, e.g.

$\equiv$SiXYXSi$\equiv$
  Y
  X
  Si
  ///

$\equiv$SiXYXSi$\equiv$
  X
  Si
  ///

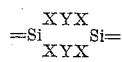
$\equiv$SiXYXSi$\equiv$
  Y   Y
  X   X
  Si  Si
  ///  ///

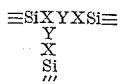
$\equiv$SiXYXSi$\equiv$
  X
  Si$\equiv$ or

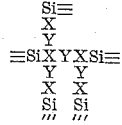

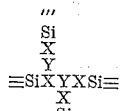

The preferred method of preparation of the linkage of this invention is the reaction of an organosilicon epoxy or epoxidized group of the type disclosed in the aforesaid copending application with ammonia or an amine having at least 2 nitrogen-bonded hydrogens under conditions such as those shown in the subsequent working examples. The simple 1:1 amine-epoxy adducts are described in applicant's copending application entitled "Organosilicon Epoxide Derivatives." In that case the amine adduct does not contribute to a polymeric structure. The term "epoxidized group" is employed here to mean an epoxy-containing group.

The organosilicon epoxides employed in applicant's preferred method are further described in applicant's copending application Serial No. 618,669, filed October 29, 1956. Two basic methods of preparation of these epoxides are shown therein. The first method is the reaction of an organosilicon compound containing a radical having a C=C linkage with peracids such as peracetic, perbenzoic and perpropionic acids, thereby oxidizing the double bond to yield an epoxy group. The second method is that of adding an unsaturated organic compound containing at least one epoxy group to a silicon compound containing at least 1 SiH group preferably in the presence of platinum, ultraviolet light, organic peroxides or other silane addition catalyst. The epoxidized radical can, therefore, consist of an epoxy group connected directly to a silicon atom or can be connected to the silicon through a variety of linking chains. The epoxidized radicals employed herein can also contain more than one epoxy group, for instance, where a butadienyl radical attached to silicon is oxidized with a peracid to produce the corresponding diepoxy radical. The number of free valences of any X equals one plus the number of epoxy groups which were in the group from which that X was derived and which react with N.

Thus X radicals derived from epoxidized radicals can include such radicals as:

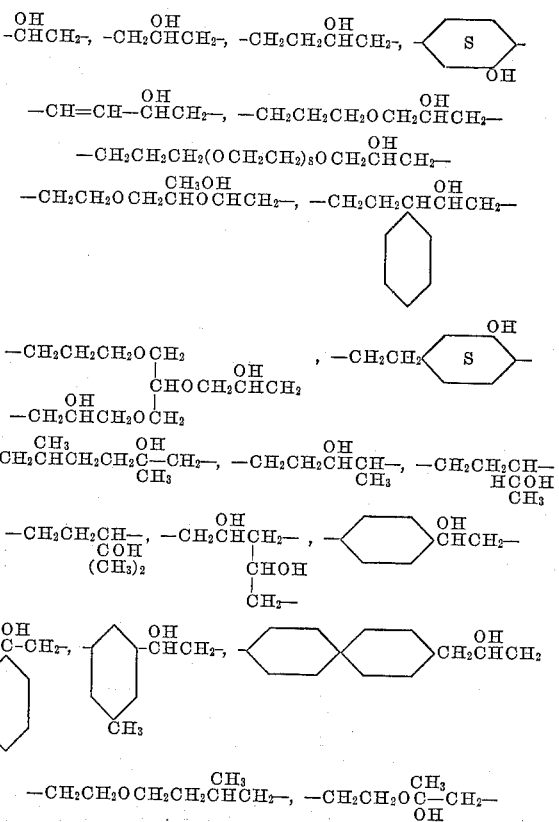

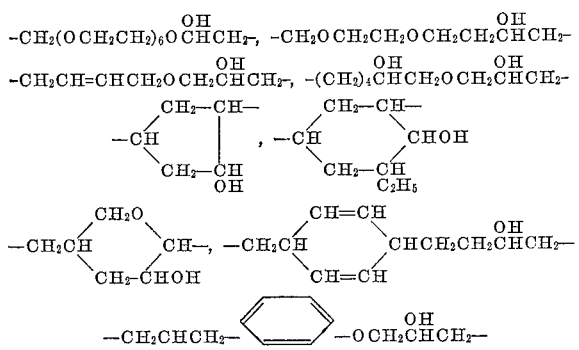

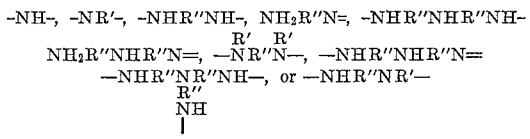

Y in this invention, as stated above, is a polyvalent radical attached to at least two X radicals by nitrogen-carbon bonds. It is derived by the preferred method of this invention from ammonia or an organic compound containing at least 2 nitrogen-bonded hydrogens. When this amino-organic compound or ammonia is reacted with a silicon-bonded epoxidized group, a nitrogen-bonded hydrogen leaves the nitrogen atom, the epoxy group breaks open, the nitrogen atom attaches to one carbon and the free hydrogen atom attaches to the free oxygen-valence, thereby forming an hydroxyalkyl-amine linkage. In order for an amino-organic compound to be operative in this invention, it is necessary that there be at least 2 nitrogen-bonded hydrogens to make possible reaction with 2 different epoxy groups. Thus, Y can be such radicals as $$-NH-, -NR'-, -NHR''NH-, NH_2R''N=, -NHR''NHR''NH-$$
$$NH_2R''NHR''N=, -\underset{R'}{N}R''N-, -NHR''NHR''N=$$
$$-NHR''\underset{R''}{N}R''NH-, \text{ or } -NHR''NR'-$$
$$\underset{|}{NH}$$

where R' is a monovalent organic radical and R'' is a divalent organic radical, neither of which radicals contain hydrolyzable halogen atoms or acid groups having a dissociation constant greater than $10^{-3}$. These specific exceptions are necessary since the groups included are sufficiently reactive with epoxy groups that their reaction therewith would substantially interfere with the amine-epoxy reaction.

Examples of halogen atoms readily hydrolyzable at room temperature include acid halides, such as acyl chloride, acyl bromide, acyl iodide and sulfonyl chloride, and silicon-bonded halogen atoms, such as silicon-bonded chlorine, silicon-bonded bromine, silicon-bonded iodine and silicon-bonded fluorine. Examples of acid groups which have a dissociation constant greater than $10^{-3}$ and therefore cannot be present are the sulfonic acid group and acid groups derived from such organic acids as trichloroacetic acid and picric acid. It can be seen, therefore, that the radicals R' and R'' can contain a large variety of different functions.

The R' and R'' groups which can be present in the amino-organic compositions employed in this invention can be, for example, non-functional saturated hydrocarbon radicals or they can be any hydrocarbon radicals which contain any unsaturated function, any nitrogen function, any halogen not readily hydrolyzable at room temperature, any metallic function, any oxygen function and any sulfur function except acid groups with a dissociation constant above $10^{-3}$. More specifically, these functions can contain any groups such as the following: nitrogen functional groups, such as nitro, nitroso, amine, azo, azoxy, imido, and nitrile; unsaturated functions, such as alkene and alkyne linkages; halides such as chlorine, bromine, fluorine and iodine, which are not readily hydrolyzable at room temperature; sulfur functional groups, such as sulfone, sulfoxide, mercaptan, thioaldehyde, thioketone, thioesters and thioether; oxygen functional groups such as hydroxyl, ether, carbonyl (both ketone and aldehyde), carboxyl and ester. It should be understood that the R' and R'' groups can contain two or more of the above functions in any arrangement within the other limitations of this invention. These functions can be incorporated into any aliphatic, alicyclic or aromatic radicals. Furthermore, any organometallic function or metal oxygen function can be present without interfering with the formation of the claimed composition of this invention.

Thus, amino-organic compounds which react with epoxidized organosiloxane compounds to form the compositions of this invention can include any of the following compounds: ethane semicarbazone, acetaldehyde-ammonia, acetamide, α,α-dichloroacetamide, thioacetamide, acetamidine, o-aminoacetophenone, acrylamide, adalin, adipamide, allanturic acid, ethyl ester of allo-phanic acid, allylamine, ammelide, tert-amylamine, aniline, n-benzohydryl, 2,4-dibromo-6-nitroaniline, o-fluoroaniline, p-nitrosoaniline, ar-pentachloroaniline, p,p'-thiodianiline, anisamide, m-anisidine, 9,10-anthradiamine, anthranilaldehyde, methyl ester of anthranilic acid, 3-nitroanthranilic acid, anthranilonitrile, 2-amino-1-hydroxyanthraquinone, arsanilic acid, L-aspartic acid, p-aminoazobenzene, 5,5-diallylbarbituric acid, 5-(2-furfurylidene)-2-thiobarbituric acid, benzalhydrazine, benzamidoxime, benzamidine, benzenepentamine, benzenesulfonamide, 3-ethoxybenzidine, benzidine sulfone, benzocaine, p-aminobenzohydrol, benzohydrazide, 3-amino-5-nitrobenzoic acid, o-sulfamylbenzoic acid, 2,2'-diaminobenzophenone, biguanide, acetylbiuret, bornylamine, 2-aminobutanol, cadaverine, 3-aminocamphor, dithiocarbamic acid, thiolcarbamic acid-ethyl ester, thionocarbamic acid-ethyl ester, thiocarbanilide, 1,5-diphenylcarbohydrazide, m-aminocinnamic acid, 3-amino-o-cresol, crotonamide, cyanamide, cyclohexylamine, L-cysteine, diethylenetriamine, ethoxyamine, formamide, formohydrazide, D-fructosamine, guanidine, p-bromophenylhydrazine, piperazine, o-nitrophenylhydrazine, lactamide, nicotinamide, ethyloxamate, oxamide, pararosaniline, 2-phenanthrylamine, 2-nitrophenetidine, p-aminothiophenol, 2-aminopyridine, 4-aminoquinoline, thiosemicarbazide, sulfanilamide, tetradecylamine, 3-thiophenesulfonamide, thiophenine, α,α,α-trifluoro-m-toluidine, 2-bromo-5-nitro-p-toluidine, urea, allylurea, allylthiourea, ethylideneurea, nitrourea, p-phenethylurea, vinylamine, sulfaguanidine, dimethylgallium amide, and aminophenylmercuric acetate.

This list is not complete but is intended to emphasize the broad scope of the Y radical in the linkage unit of this invention.

Any remaining valences on the silicon atoms of the compounds of this invention can be satisfied by a hydrogen atom, oxygen atom, hydroxyl radical, monovalent hydrocarbon radical, a monovalent halogenohydrocarbon radical, a monovalent hydrocarbonoxy radical, a monovalent halogenohydrocarbonoxy radical or another alkanol-amine linkage to another silicon. The term "hydrocarbonoxy radical" refers to hydrocarbon radicals containing hydroxyl and/or epoxy groups and radicals of the formula —OR where R is a hydrocarbon radical. The term "halogenohydrocarbonoxy radical" refers to hydroxylated halogenohydrocarbon radicals and radicals of the formula —OR where R is a halogenohydrocarbon radical.

Operative monovalent hydrocarbon radicals include alkyl radicals, such as methyl, ethyl, isobutyl and stearyl; alkenyl radicals, such as vinyl, allyl, methallyl and butadienyl; cycloalkyl radicals, such as cyclopentyl, cyclohexyl and undecahydrodiphenyl; cycloalkenyl radicals, such as cyclopentenyl, 2,6-dimethylcyclooctadienyl and cycloheptadecenyl; aryl radicals, such as phenyl, xenyl and naphthyl; aralkyl radicals, such as benzyl, and alkaryl radicals, such as tolyl.

Operative monovalent halogenohydrocarbon radicals include, for example, chloromethyl, 3,3-dibromobutyl, 1,2-dichlorovinyl, 2,4,6-triiodocyclohexyl, 2,2-difluorocyclopentene-3,4-yl, α,α,α-trifluorotolyl, 3,3,3-trifluoropropyl, α,α-dichlorobenzyl and 2-bromo-4,6-diiodophenyl.

As shown above, the remaining valences on the silicon atoms can be satisfied by oxygen atoms attached to monovalent hydrocarbon and halogenohydrocarbon radicals, i.e. hydrocarbonoxy and halogenohydrocarbonoxy radicals. However, the oxygen atoms on silicon can also be attached to hydrogen, i.e. the hydroxyl radical on silicon to give a silanol, or to another silicon atom to form a siloxane linkage.

Thus, the organosilicon compositions of this invention

can be two silicon atoms joined by a linkage of this invention or chains of silicon atoms so joined or any combination of such groups joined together by a siloxane linkage.

A preferred species of this invention is an organopolysiloxane composition containing at least one unit of the formula

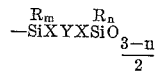

in which X and Y are as above defined, each R is a hydrogen atom, a hydroxyl radical, a monovalent hydrocarbon radical, a monovalent hydrocarbonoxy radical, a monovalent halogenohydrocarbon radical or a monovalent halogenohydrocarbonoxy radical, all of which are defined above, each $m$ has a value of from 0 to 3 and each $n$ has a value of from 0 to 2, any remaining units in said organopolysiloxane having the unit formula

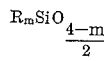

where R and $m$ are as above defined.

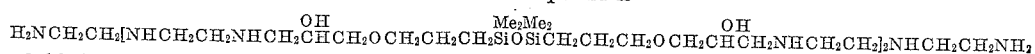

The polymers of this invention can be endblocked with groups such as —SiR$_3$ (including —Si(OH)$_3$, —Si(OSiR$_3$)$_3$, —Si(XYR')$_3$

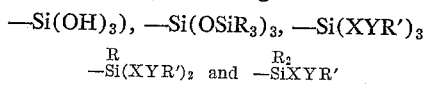

where X, Y, R and R' are as above defined. If the epoxidized siloxane concentration in the epoxy-amine reaction system is greater than the amine concentration, the resulting siloxanes will be epoxidized siloxy endblocked.

It has been found that the presence of small amounts of phenol catalyzes the epoxide-amine reactions to produce the linkages of this invention at lower temperatures and in shorter periods of time than required for the production of the same compositions without employing the phenol catalyst. The amount of phenol necessary in the system for catalysts is generally less than one percent by weight. The term "phenol" is intended to include hydroxylated aryl compounds generally and would include such compounds as chlorophenol and bis-phenol.

All the compounds of this invention are useful as modifiers for any compatible resin system. They are especially useful as curing agents for epoxide resins where there remain in the agent some primary or secondary amine groups which can react with other epoxide groups.

The compositions of this invention, when used as curing agents, are especially effective in the curing of coating resins. They contribute high temperature flexibility, improved acid resistance, increased compatability, decreased toxicity and decreased volatility in the final films as compared to films prepared using only the corresponding amine as curing agent.

The following examples are illustrative and are not intended to limit this invention which is properly delineated in the claims.

Example 1

To 80 grams of diethylene triamine in 40 grams of xylene heated to 100° C. was added dropwise a solution of 36 grams (0.1 mol) of (A) sym-bis-gamma-glycidoxypropyltetramethyldisiloxane in 80 grams of xylene. The reaction mixture was stripped of excess diethylene triamine and volatiles at 190° C. and 10 mm. Hg leaving a moderately viscous fluid product of the formula

This material was an excellent curing agent for both epoxide coating resins and epoxide casting resins.

Example 2

362 grams (1 mol) of (A) were added slowly to 412 grams (4 mols) of diethylene triamine heated to 180° C. When the almost instantaneous reaction was complete, the reaction mixture was stripped of excess diethylene triamine at 190° C. and 1 mm. Hg. 530 grams of a light amber fluid having a viscosity of 12,400 cs. at 25° C. and 11.6% by weight nitrogen were produced. This material was the same as that of Example 1 and had the formula

which has a theoretical nitrogen content of 11.2% by weight.

Example 3

181 grams (0.5 mol) of (A) were added slowly to 515 grams (5 mols) of diethylene triamine heated to 160° C. The temperature was maintained at 160° C. for 1½ hours after the addition was complete. The reaction mixture was then stripped of excess diethylene triamine at 180° C. and 1 mm. Hg. There resulted 275 grams of a clear yellow fluid having a viscosity of 5,400 cs. at 25° C. and a nitrogen content of 13.04% by weight. The formula of this compound is

Example 4

The experiment of Example 3 was repeated including in the reaction system 0.5 gram of phenol. The time of reaction was substantially decreased.

Example 5

362 grams (1 mol) of (A) were added slowly to a refluxing (120° C.) mixture of 240 grams (4 mols) of ethylenediamine and 0.5 gram of phenol. After refluxing for one hour, the reaction mixture was stripped of excess ethylene diamine and volatiles at 170° C. and 0.5 mm. Hg. 405 grams of a fluid product having a viscosity of 20,000 cs. at 25° C. and a nitrogen content of 10.9% by weight were produced. This compound was

Example 6

181 grams (0.5 mol) of (A) were added slowly to 170 grams (1 mol) of menthanediamine

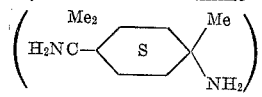

and 0.5 gram of phenol at 150° C. The reaction mixture was stirred and heated 1 hour at 190° C. and stripped of excess menthanediamine and volatiles at 190° C. and 2 mm. Hg with a nitrogen purge. There resulted 305 grams of a product found to contain 5.8% by weight nitrogen and 10.0% by weight silicon. The theoretical amounts of nitrogen and silicon in the 4:3 amine-to-epoxide adduct are 5.78% by weight nitrogen and 9.5% by weight silicon. Most of the product consisted of isomers of the basic formula

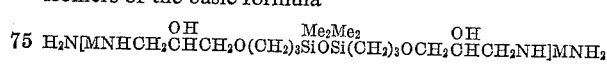

where M is the radical

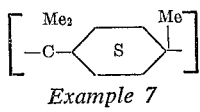

Example 7

36 grams (0.1 mol) of (A) were added slowly to 19 grams (0.11 mol) of menthanediamine and 0.5 gram of phenol in 30 grams of xylene heated to 150° C. The reaction mixture was refluxed for 3 hours. 15 grams of xylene were added to make a 55% by weight solids solution having a viscosity of 210 cs. When this solution was used as a curing agent for an epoxy coating resin, the resultant coating had excellent thermal stability.

Example 8

170 grams (1 mol) of menthanediamine and 0.5 gram of phenol were refluxed in 200 grams of xylene. 362 grams (1 mol) of (A) were added slowly and refluxing was continued for one hour more. The result was a clear solution

having a viscosity of 1000 cs. at 25° C. Upon prolonged heating this solution became a sticky rubber.

Example 9

80 grams (0.75 mol) of m-phenylenediamine and 0.5 gram of phenol were refluxed in 50 grams of xylene. 91 grams (0.25 mol) of (A) were added slowly. The mixture was refluxed for 4 hours at 150° to 155° C. and subsequently stripped of excess m-phenylenediamine and volatiles at 170° C. and 1 mm. Hg. There was obtained 135 grams of a tar which was

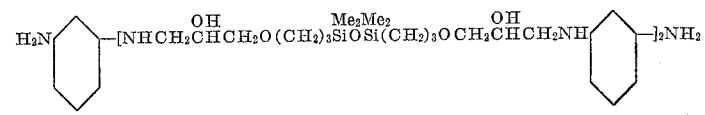

Mixtures of this composition with epoxy resins had good pot stability. Epoxide resins cured with this product were tougher and more heat stable than similar epoxide resins cured only with m-phenylenediamine.

Example 10

100 grams (0.27 mol) of (A) were heated for 16 hours at 120 to 130° C. with 13 grams (0.13 mol) of m-phenylenediamine. A black rubbery solid was produced containing the unit

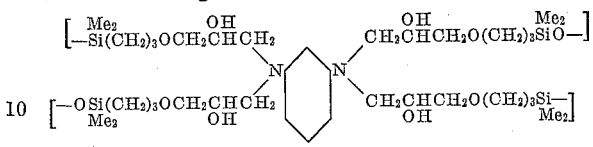

Example 11

100 grams (0.5 mol) of methylenedianiline and 1 gram of phenol were refluxed in 100 grams of xylene. Over a period of 5 hours 100 grams (0.27 mol) of (A) were added to the refluxing mixture. The mixture was refluxed one more hour and stripped of excess methylenedianiline and volatiles at 150° C. and 2 mm. Hg. There were obtained 190 grams of an amber tar of the formula

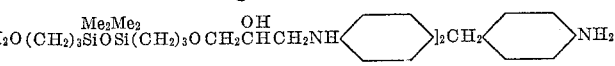

Epoxide coating resins cured with this agent gave light, hard films with greater flexibility and heat resistance than similar resins cured with methylenediamine.

Example 12

When 2 mols of mono-gamma-glycidoxypropylpentamethyldisiloxane are reacted with 1 mol of anhydrous ammonia in ethanol, the resulting product has the formula

Example 13

When 2 mols of the following organosilicon compounds are reacted with one mol of the following amines while refluxing in xylene solution, the adducts listed are produced:

| Epoxide | Amine | Adduct |
|---|---|---|
| 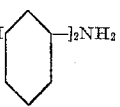 CH₂CHCH₂O(CH₃CH₂O)₃CH₂CH₂CH₂Si(OC₆H₅)₂Me | thioacetamide | (C₆H₅O)₂Si(CH₂)₃(OCH₂CH₂)₃OCHCH₂NCH₂CHCH₂O-(CH₂CH₂O)₃(CH₂)₃Si(OC₆H₅)₂ with OH, C=S OH, CH₃, Me groups |
| CH₂CHCH₂CH₂SiOH with Ph₂ | piperazine | HOSiCH₂CH₂CHCH₂N(CH₂CH₂)(CH₂CH₂)NCH₂CHCH₂CH₂SiOH with Ph₂, OH, OH |
| CH₂CHCH₂CH₂Si(OEt)₃ | p-aminobenzoic acid | (EtO)₃SiCH₂CH₂CHCH₂—N—CH₂CHCH₂CH₂Si(OEt)₃ with OH, OH, C₆H₄COOH |
| CH₂CHCH₂CH₂Si(OEt)₂ with C₆H₄Cl | thiosemicarbazide | (EtO)₂SiCH₂CH₂CHCH₂NHNHCNHCH₂CHCH₂CH₂Si(OEt)₂ with C₆H₄Cl, OH, S, OH, C₆H₄Cl |
| CH₂CHCH₂CH₂Si(OC₆H₄Cl)₂ with CH₂CH₂CF₃ | allanturic acid | (ClC₆H₄O)₂SiCH₂CH₂CHCH₂N(...)NCH₂CHCH₂CH₂- with CH₂CF₃, CH₂, OH, OH, CH₂CH₂CF₃, Si(OC₆H₄Cl)₂ |

| Epoxide | Amine | Adduct |
|---|---|---|

(table content consists primarily of chemical structure drawings)

Example 14

When 4 mols of

Me₃SiOSi(Me₂)CH₂CH₂CH₂O CH₂CH(OH)CH₂NH₂ are reacted with one mol of

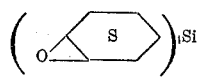

under the conditions of Example 13, the product is

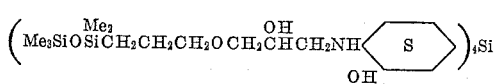

Example 15

When 3 mols of ethylene diamine are reacted with two mols of

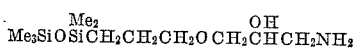

under the conditions of Example 13, the product is

NH₂CH₂[CH₂NHCH₂CH(OH)OCH(CH₃)CH₂OCH₂CH₂Si(OEt)₂CH₂OCH₂CH(CH₃)OCH(OH)CH₂NHCH₂]₂CH₂NH₂

Example 16

When 1 mol of benzohydrazide are reacted with two mols of

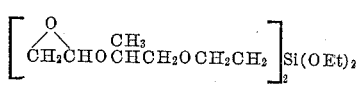

under the conditions of Example 13, one of the products is

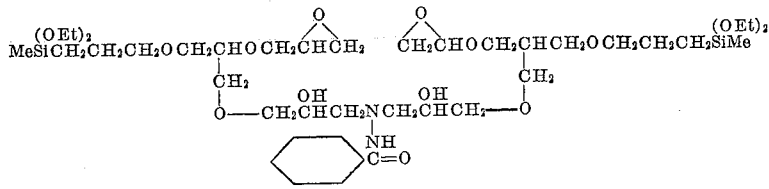

Example 17

When 4 mols of guanidine are reacted with 3 mols of

under the conditions of Example 13, the product is

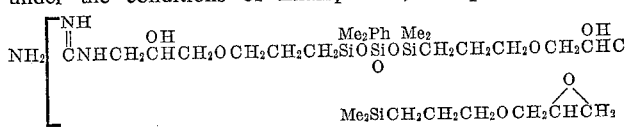

Example 18

When 1 mol of benzidine sulfone is reacted with 2 mols of

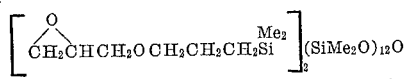

under the conditions of Example 13, the product is

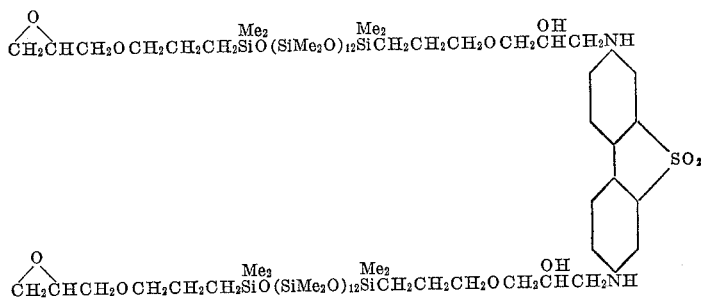

Example 19

When polysiloxanes containing the following units are reacted with refluxing ethylene diamine in a ratio of 2 mols of the siloxane unit per mol of ethylene diamine, the resulting products will include the units shown below.

Example 20

When 2 mols of

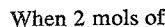

are added slowly to 1 mol of ethylene diamine under reflux conditions, the product is a mixture of

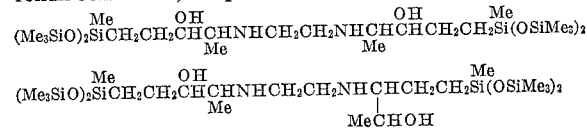

and

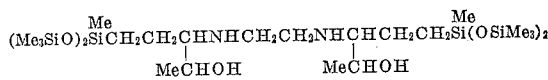

| Epoxide | Adduct |
|---|---|
| —OSi(Me)⟨⟩CHCH₂O | —OSi(Me)⟨⟩OH CHCH₂NHCH₂CH₂NHCH₂CH⟨⟩Si(Me)—O |
| —OSi(Me)(Me)CH₂CHCH₂CH₂C(MeO)—CH₂ | —OSi(Me)(Me)CH₂CHCH₂CH₂C CH₂NHCH₂CH₂NHCH₂CCH₂—CH₂ with OH groups, CHMe, —OSiCH₂(Me) |
| —OSi(Ph)CH₂CH₂CH₂OCH₂CHCH₂ | —OSi(Ph)CH₂CH₂CH₂O CH₂CHCH₂NHCH₂CH₂NHCH₂CH (OH, OH) CH₂ —SiCH₂CH₂CH₂—O (Ph) |
| —OSi(Me)CH₂CH₂CHCMe₂ | —OSi(Me)CH₂CH₂CHNHCH₂CH₂NHCHCH₂CH₂Si—O (Me) with COH Me₂ groups |
| O₁.₅SiCH₂CH₂CH₂O CH₂CHCH₂O CH₂CHCH₂ (OH) | O₁.₅SiCH₂CH₂CH₂O CH₂CHCH₂O CH₂CHCH₂NH (OH, OH) CH₂ CH₂ O₁.₅SiCH₂CH₂CH₂O CH₂CHCH₂O CH₂CHCH₂NH (OH, OH) |

That which is claimed is:

1. An organopolysiloxane composition containing at least one unit of the formula

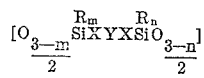

in which each Y is a divalent radical composed of atoms selected from the group consisting of carbon, hydrogen, oxygen, nitrogen, sulfur, metal and non-hydrolyzable halogen atoms and is attached to both X radicals by carbon-nitrogen bonds, said Y radical being free of acid groups having a dissociation constant greater than $10^{-3}$, each X is a divalent organic radical connected to silicon by a silicon-carbon linkage and consisting of hydrogen atoms, carbon atoms and oxygen atoms, the latter being present in configurations of the group consisting of hydroxyl groups, epoxy groups and ether linkages, said X radical containing at least one pair of adjacent carbon atoms, one carbon atom of said pair being attached to a hydroxyl group and the other carbon atom of said pair being attached to a nitrogen atom of the radical Y, each R is a monovalent radical selected from the group consisting of the hydrogen atom, the hydroxyl radical, hydrocarbon radicals, halogenohydrocarbon radicals, hydrocarbonoxy radicals and halogenohydrocarbonoxy radicals, each $m$ has a value of from 0 to 3 and each $n$ has a value of from 0 to 2, any remaining units of said organopolysiloxane having the formula

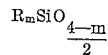

in which R and $m$ are as above defined.

2. A composition of the formula

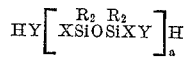

in which each Y is a divalent radical composed of atoms selected from the group consisting of carbon, hydrogen, oxygen, nitrogen, sulfur, metal and non-hydrolyzable halogen atoms and is attached to two X radicals by carbon-nitrogen bonds, said Y radical being free of acid groups having a dissociation constant greater than $10^{-3}$, each X is a divalent organic radical connected to silicon by a silicon-carbon linkage and consisting of hydrogen atoms, carbon atoms and oxygen atoms, the latter being present in configurations of the group consisting of hydroxyl groups, epoxy groups and ether linkages, said X radical containing at least one pair of adjacent carbon atoms, one carbon atom of said pair being attached to a hydroxyl group and the other carbon atom of said pair being attached to a nitrogen atom of the radical Y, each R is a monovalent radical selected from the group consisting of the hydrogen atom, the hydroxyl radical, hydrocarbon radicals, halogenohydrocarbon radicals, hydrocarbonoxy radicals and halogenohydrocarbonoxy radicals, and $a$ has an average value of from 2 to 4.

3. A composition of the formula

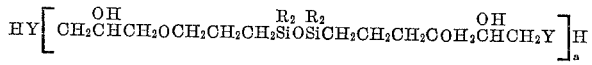

in which each Y is a divalent radical composed of atoms selected from the group consisting of carbon, hydrogen, oxygen, nitrogen, sulfur, metal and non-hydrolyzable halogen atoms and is attached to carbon by carbon-nitrogen bonds, said Y radical being free of acid groups having a dissociation constant greater than $10^{-3}$, each R is a monovalent radical selected from the group consisting of the hydrogen atom, the hydroxyl radical, hydrocarbon radicals, halogenohydrocarbon radicals, hydrocarbonoxy radicals and halogenohydrocarbonoxy radicals, and $a$ has an average value of from 2 to 4.

4. The composition of claim 3 in which each R is a methyl radical.

5. The composition of claim 3 in which each R is a phenyl radical.

6. The composition of claim 3 in which some R groups are methyl radicals and the remainder of the R groups are phenyl radicals.

References Cited in the file of this patent

UNITED STATES PATENTS

| | | |
|---|---|---|
| 2,628,244 | Speier | Feb. 10, 1953 |
| 2,723,987 | Speier | Nov. 15, 1955 |
| 2,730,532 | Martin | Jan. 10, 1956 |
| 2,754,284 | Speck | July 10, 1956 |
| 2,843,560 | Mika | July 15, 1958 |